United States Patent Office 3,057,845
Patented Oct. 9, 1962

3,057,845
COMPLEX COPPER COMPOUNDS OF AZO DYESTUFFS
Hans Wilhelm Liechti, Oberwil, and Rudolf Ruegg, Basel, Switzerland, assignors to Ciba Limited, Basel, Switzerland
No Drawing. Filed June 29, 1959, Ser. No. 823,302
Claims priority, application Switzerland July 4, 1958
6 Claims. (Cl. 260—146)

This invention provides valuable new complex copper compounds of ortho:ortho'-dihydroxyazo-dyestuffs which are free from acid groups imparting solubility in water and not bound in complex union, and which contain at least one quaternary amino group. The invention provides more especially complex copper compounds of the formula (1) 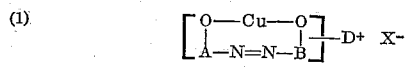

in which A represents the radical of a diazo-component, B represents the radical of a coupling component, D represents (a)

wherein each of $R_1$, $R_2$ and $R_3$ represents an alkyl, especially a lower alkyl, such as methyl or ethyl; a cycloalkyl, for example cyclohexyl; or an aralkyl, for example benzyl, radical that may be substituted or (b) the radical of a heterocyclic ring system, for example a pyridine, and X represents an anion, and in which the —O— atoms are in ortho-position to the azo linkage.

The quaternary amino group may either be bound directly to an aromatic nucleus of the dyestuff molecule or bound to the dyestuff molecule through a bridge member, for example, an alkylene group or a radical of the formula —Z-alk-, in which Z represents an oxygen or sulfur atom or an amino group or a carboxylic acid amide or sulfonamide group.

The invention also provides a process for the manufacture of the aforesaid new dyestuffs, wherein an ortho:ortho'-dihydroxy-azo-dyestuff which is free from sulfonic acid groups and contains at least one quaternary amino group, is treated with an agent yielding copper.

As starting materials for use in the process there may be mentioned, for example, disazo-dyestuffs, and especially monoazo-dyestuffs. These dyestuffs can be obtained, for example, by coupling an ortho-hydroxy-diazo-component free from sulfonic acid groups with a coupling component which is free from acid groups imparting solubility in water, and is capable of coupling in ortho-position to a phenolic or enolic hydroxyl group, at least one of the two components, advantageously the diazo-component, containing a quaternary amino group. Alternatively, the dyestuffs can be obtained by quaternating an ortho:ortho'-dihydroxy- or ortho-hydroxy-ortho'-carboxy-azo-dyestuff containing an amino group. As ortho-hydroxy-diazo-compounds free from sulfonic acid groups there may be mentioned, for example, diazo-compounds of aminonaphthalenes, and especially of aminobenzenes, for example, 1-hydroxy-2-aminobenzene, 1-hydroxy-2-amino-4-methylbenzene, 1-hydroxy-2-amino-4- or -5-nitrobenzene, 1-amino-2-hydroxy-naphthalene, 2-amino-1-hydroxynaphthalene or a compound of one of the formulae

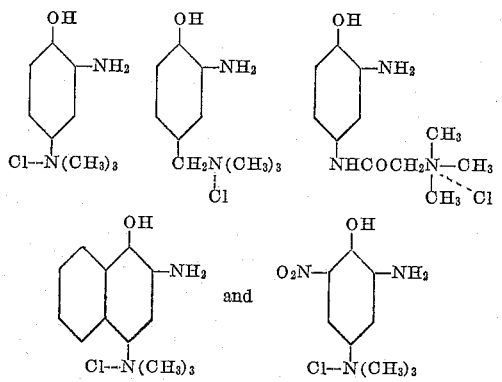

As coupling components there are advantageously used β-naphthols or compounds that contain an enolic ketomethylene group, for example, pyrazolones or acetoacetic acid arylides, which are free from acid groups imparting solubility in water. As examples of suitable coupling components there may be mentioned acetoacetic acid anilide and 1-acetoacetylamino-2-, -3- or -4-chlorobenzene, 1-phenyl-3-methyl-5-pyrazolone, 1-ethyl-3-methyl-5-pyrazolone, 5-chloro-8-hydroxyquinoline, 2:4-dihydroxyquinoline, 2-hydroxynaphthalene, 6-bromo or 6-methoxy-2-hydroxynaphthalene, 4:8- or 5:8-dichloro-2-hydroxynaphthalene, 1-acetylamino-7-hydroxynaphthalene, 1-n-butyrylamino-7-hydroxynaphthalene, 1-carbethoxyamino-7-hydroxynaphthalene, 5-chloro-1-hydroxynaphthalene and 2-hydroxynaphthyl-7-trimethylammonium chloride.

The coupling may be carried out by a method in itself known, for example, in a neutral to acid medium, if desired, in the presence of sodium acetate or a like buffer substance capable of influencing the speed of coupling. The components must be so chosen that at least one quaternary amino group is present in the finished dyestuff.

As agents yielding copper there are advantageously used copper salts, and especially copper acetate. The coppering is carried out by a method in itself known, advantageously at a raised temperature under atmospheric or superatmospheric pressure, for example, at the boiling temperature of the reaction mixture, if desired, in the presence of suitable additions, for example, in the presence of a salt, organic acid or a base, organic solvent or other agent assisting the formation of complexes. It is especially advantageous to carry out the coppering in a dialkyl-formamide, especially dimethyl-formamide.

The invention also provides a modification of the process described above for making the new dyestuffs, wherein (a) a complex copper compound of an ortho:ortho'-dihydroxy-azo-dyestuff which is free from sulfonic acid groups and contains a halogen-acylamino group derived from an aliphatic monocarboxylic acid, advantageously an α-chloro- or α-bromo-acetylamino group, is treated with a tertiary amine, for example, trimethylamine or pyridine, or (b) a complex copper compound of an ortho:ortho'-dihydroxy-azo-dyestuff which is free from sulfonic acid groups and contains a primary or secondary amino group, is reacted with a halide of an aliphatic monocarboxylic acid containing a quaternary amino group, and especially a halide of the formula

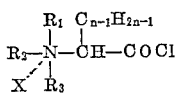

in which $R_1$, $R_2$, $R_3$ and X have the meanings given above and $n$ is a whole number not greater than 8, or (c) a complex copper compound of an ortho:ortho'-dihydroxy-azo-dyestuff which is free from sulfonic acid groups and contains at least one amino group, is treated with an alkylating agent, especially an alkyl halide or aralkyl halide or an alkyl or aralkyl ester of sulfuric acid or an organic sulfonic acid. As examples of suitable alkylating agents there may be mentioned: Methyl chloride, methyl bromide, methyl iodide, benzyl chloride, dimethyl sulfate, diethylsulfate, benzene sulfonic acid methyl ester and para-toluene sulfonic acid ethyl or butyl ester.

In the case of complex copper compounds which contain only tertiary amino groups, the alkylating agents merely quaternates the nitrogen atom, that is to say, it forms a cyclammonium group. When the dyestuff also contains a secondary or primary amino group, alkylation of such group may also occur. In order to obtain a good yield it is in all cases of advantage to use an excess of the alkylating agent.

By using an inert organic solvent the salt of the dyestuff can be precipitated during the reaction and then isolated by filtration. The solvent may be removed by distillation, for example, in vacuo or with steam.

The dyestuff salts are advantageously purified by dissolution in water, whereby any unreacted dyestuff used as starting material can be filtered off as an insoluble radical. The dyestuff can be separated from the aqueous solution by the addition of a water-soluble salt, for example, sodium chloride.

The cupriferous dyestuffs of the invention dissolve easily in water and are more soluble than the metal-free dyestuffs used as starting materials for making them. They are suitable for dyeing and printing various substances, for example, animal fibers, such as silk, hair or leather, vegetable fibers such as ordinary or tanned cotton, cellulose acetate artificial silk, and especially for dyeing polyacrylonitrile fibers tints that are very fast to light.

The following examples illustrate the invention, the parts and percentages being by weight:

*Example 1*

3.8 parts of the dyestuff, obtained by coupling diazotized 1-trimethyl-(4-hydroxy-3-aminophenyl)-ammonium chloride with 1-phenyl-3-methyl-pyrazolone-(5) in a medium rendered alkaline with an alkali metal carbonate, are mixed in 50 parts of acetic acid of 80% strength at 90° C. with a solution of 2 parts of copper acetate in 50 parts of acetic acid of 80% strength. The reaction mixture is boiled for 3 hours under reflux and then poured into 500 parts of water. The intensely yellow coloured solution is stirred at the boil with active carbon and filtered clear. By the addition of 50 parts of sodium chloride the complex copper compound of the dyestuff is precipitated.

The isolated and dried dyestuff is an orange powder which dissolves in water with a yellow coloration, and dyes fibers and fabrics of polyacrylonitrile, for example, Orlon 42, yellow tints of very good fastness to light.

By using, instead of 1-trimethyl-(4-hydroxy-3-aminophenyl)-ammonium chloride as diazo-component, 1-trimethyl-(4-hydroxy-3-amino-5-nitrophenyl)-ammonium chloride, there is obtained a dyestuff which dyes fibers and fabrics of polyacrylonitrile orange tints having the same good fastness to light.

Dyestuffs, which dye fibers and fabrics of polyacrylonitrile tints of the same good fastness to light, are obtained by using 3-methyl-5-pyrazolone-(5) as coupling component, instead of 1-phenyl-3-methyl-pyrazolone-(5).

*Example 2*

3.9 parts of the dyestuff, obtained by coupling diazotized 1-trimethyl-(4-hydroxy-3-aminophenyl)-ammonium chloride with acetoacetic acid anilide in a medium rendered alkaline with an alkali metal carbonate, are dissolved in 80 parts of acetic acid of 80% strength at 90° C. To the solution are added 2 parts of copper acetate, and the reaction mixture is boiled under reflux for 3 hours. The mixture is then diluted with 300 parts of water, and clarified by filtration with active carbon at the boil. The copper complex is then precipitated by the addition of 30 parts of sodium chloride.

The isolated and dried dyestuff is an orange powder which dissolves in water with a yellow coloration, and dyes fibers and fabrics of polyacrylonitrile, such as Orlon 42, yellow tints of very good fastness to light.

Complex copper compounds having the same excellent properties are obtained by using for making monoazo-dyestuffs as coupling component acetoacetic acid ortho-chloranilide or acetoacetic acid para-anisidide, instead of acetoacetic acid anilide.

*Example 3*

3.6 parts of the dyestuff obtained in known manner from diazotized 1-trimethyl-(4-hydroxy-3-aminophenyl)-ammonium chloride and 2-hydroxynaphthalene are mixed in 50 parts of dimethyl-formamide at 90° C. with a solution of 2 parts of copper acetate in 50 parts of dimethyl-formamide, and the mixture is boiled under reflux for 3 hours. Then the reaction mixture is poured into 500 parts of water, the boiling solution is filtered after the addition of active carbon, and the complex copper compound is precipitated by the addition of 50 parts of sodium chloride.

The new dyestuff is a brown powder which dissolves in water with a blue-red coloration, and dyes fibers and fabrics of polyacrylonitrile, such as Orlon 42, claret red tints of very good fastness to light.

By using, instead of 1-trimethyl-(4-hydroxy-3-aminophenyl)-ammonium chloride as diazo-component, 1-trimethyl-(4-hydroxy-3-amino-5-nitrophenyl)-ammonium chloride, there is obtained a dyestuff which dyes fibers or fabrics of polyacrylonitrile red-violet tints having the same good fastness to light.

Dyestuffs, which yield on fibers and fabrics of polyacrylonitrile dyeings having the same excellent fastness to light, are obtained by using as coupling component, instead of 2-hydroxynaphthalene, 2-hydroxy-6-methoxynaphthalene, 2-hydroxy-8-acetylaminonaphthalene or 2-hydroxy-8-butyrylaminonaphthalene for making the monoazo-dyestuff.

*Example 4*

4.6 parts of the dyestuff of the formula

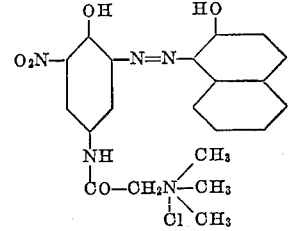

are introduced at 90° C. in small portions in the course of 15 minutes into a solution of 2 parts of copper acetate in 80 parts of acetic acid of 80% strength. The whole is stirred for a further 3 hours at 90° C. and is then allowed to cool. The cold, completely precipitated complex copper compound is then isolated and dried.

The new dyestuff is a dark powder which dissolves in water with a violet coloration, and dyes fibers and fabrics of polyacrylonitrile, such as Orlon 42, violet tints of very good fastness to light.

By using, instead of 2-hydroxynaphthalene as coupling component, 2-hydroxy-8-acetylaminonaphthalene, there is obtained a dyestuff which dyes fibers or fabrics of polyacrylonitrile, the tints having the same good fastness to light.

Example 5

1 part of the complex copper compound obtained as described in Example 1 is dissolved in 5000 parts of water with the addition of 2 parts of acetic acid of 40% strength. 100 parts of a boiled yarn of polyacrylonitrile staple fibers are entered into the dyebath at 60° C., the temperature is raised in the course of ½ hour to 100° C., and dyeing is carried on for one hour at the boil. The dyeing is then rinsed and dried. There is obtained a yellow dyeing of very good fastness to light.

Example 6

4.0 parts of the dyestuff obtained by coupling diazotized 1-hydroxy-2-amino-5-nitrobenzene with 1-β-chloroacetyl-amino-7-hydroxynaphthalene in a medium rendered alkaline with alkali metal carbonate are mixed with 150 parts of acetic acid of 80% strength at 90° C. with a solution of 2 parts of copper acetate in 50 parts of acetic acid of 80% strength. The reaction mixture is refluxed for 3 hours, the greater part of the copper complex precipitating. The precipitation is completed by the addition of 200 parts of water, and the reaction mass then filtered cold.

The dyestuff paste is stirred at room temperature in 100 parts of pyridine of 50% strength, and the temperature then raised to 90° C. in the course of 2 hours. Stirring is continued for 2 hours at 90-95° C. and the reaction mixture poured into 300 parts of water. 15 parts of sodium chloride are added to precipitate the dyestuff completely.

The dyestuff, after being isolated and dried, is a black powder which dissolves in water with a blue coloration and dyes fibers and fabrics of polyacrylonitrile, for instance Orlon 42, blue tints of very good fastness to light.

A dyestuff with the same good properties of fastness is obtained when for the quaternation of the copper complex trimethylamine is used instead of pyridine.

What is claimed is:
1. Dyestuff of the formula

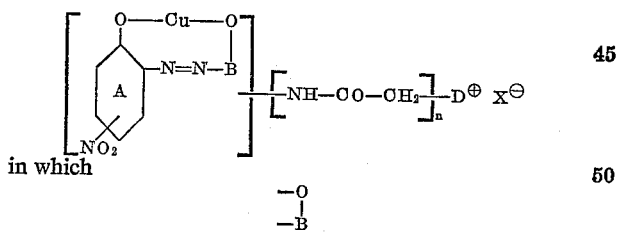

in which

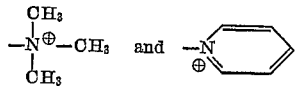

represents the radical of a coupling component selected from the group consisting of β-naphthols, aceto-acetic acid anilides and 1-phenyl-3-methyl-pyrazolones-5, D⊕ represents a member selected from the group consisting of $$-\overset{CH_3}{\underset{CH_3}{\overset{|}{N}^{\oplus}}}-CH_3 \quad \text{and} \quad -N_{\oplus}\bigcirc$$

X is a water-solubilizing anion, n is one of the numbers 0 and 1, the —O— atom at B is in ortho position to the azo group, and the radical

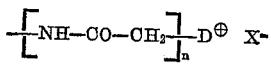

being bound to a member selected from the group consisting of a β-naphthol and the benzene ring A, the β-naphthol being one definition of

2. The complex copper compound of the formula

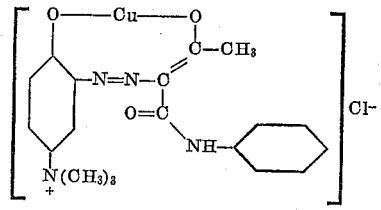

3. The complex copper compound of the formula

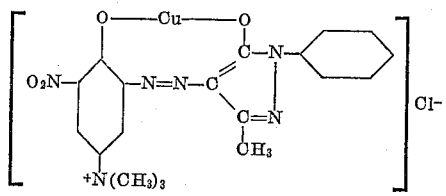

4. The complex copper compound of the formula

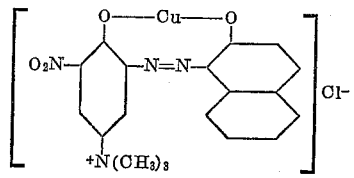

5. The complex copper compound of the formula

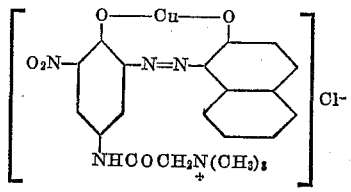

6. The complex copper compound of the formula

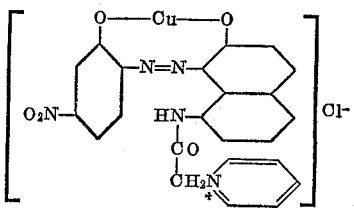

References Cited in the file of this patent
UNITED STATES PATENTS

| | | |
|---|---|---|
| 1,656,844 | Straub et al. | Jan. 17, 1928 |
| 2,778,816 | Buehler et al. | Jan. 22, 1957 |
| 2,819,945 | Rhyner et al. | Jan. 14, 1958 |
| 2,821,526 | Boyd | Jan. 28, 1958 |
| 2,922,690 | Mueller et al. | Jan. 26, 1960 |

FOREIGN PATENTS

| | | |
|---|---|---|
| 435,249 | Great Britain | Sept. 9, 1935 |